United States Patent Office 3,676,070
Patented July 11, 1972

3,676,070
MANUFACTURE OF CARBON BLACK
John W. Vanderveen, Paul J. Cheng, K. Louis Mills, Jr., Charles R. Venable, Jr., and Paul H. Johnson, Bartlesville, Okla., assignors to Phillips Petroleum Company
No Drawing. Filed Jan. 29, 1971, Ser. No. 111,082
Int. Cl. C09c 1/48
U.S. Cl. 23—209.4                                    9 Claims

ABSTRACT OF THE DISCLOSURE

In a process for producing carbon black in which a hydrocarbon feed is pyrolytically decomposed in a carbon black reactor an oxide of aluminum or zirconium is introduced into the carbon black reactor in an amount sufficient to prevent the decomposition of the refractory lining as caused by the presence of barium, calcium, and iron but insufficient to effect the structure of the carbon black product.

---

This invention relates to the manufacture of carbon black. In one of its more specific aspects, this invention relates to preventing deterioration of the reactor in which the carbon black is produced.

The manufacture of carbon black in reactors constructed of high temperature refractories can be carried out employing a wide variety of feedstocks. Because of their prior processing, certain of these feedstocks contain quantities of extraneous materials which, at high temperatures required for the pyrolytic decomposition of the feedstock, combine with that refractory which forms the interior lining of the reactor and cause its deterioration. Such deterioration is evidenced by the slagging of the refractories or the formation of deposits within the reactor. Most frequently, these extraneous materials attack the lining by combining with its components to form complexes having a melting point lower than that temperature at which the pyrolytic decomposition is conducted. As a result, these complexes appear as ash in the reactor. Continual decomposition of the refractory liner in this manner eventually requires that the refractory liner be replaced. This invention solves this problem.

According to this invention, there is provided a process for preventing the deterioration of the interior surface of the refractory lining of a carbon black reactor resulting from the introduction into reactor of a material selected from the group consisting of barium, calcium and iron. There is introduced into the reactor an oxide of a matreial selected from the group consisting of aluminum and zirconium. This oxide is introduced in an amount sufficient to substantially prevent the decomposition of the refractory lining but in an amount insufficient to substantially affect the structure of the carbon black.

The method of this invention is applicable to all carbon black reactors, regardless of their configuration. It is similarly applicable to all feedstocks, regardless of origin, which contain any extraneous material which can combine with the refractory lining of the reactor to form materials which cause deterioration of the lining, as evidenced principally by slagging of the refractory.

Such extraneous materials may be originally present in the crude oil from which the feedstock is derived or they may be incorporated into the feedstock in a processing step. For example, if the feedstock has been previously subjected to catalytic cracking, it can contain quantities of barium. Other materials which will similarly act to deteriorate the refractory are iron and calcium, relative to both of which the present invention is effective.

In one embodiment, the method of the present invention is based upon the introduction into the reactor of an additive contemplated to combine with that extraneous material contained in the feedstock and thereby to obviate the deleterious effect of that extraneous material on the refractory.

In another embodiment, the additive introduced into the reactor is deposited upon the refractory. As the refractory combined with the extraneous material there is produced a complex which tends to melt. With the deposition of the additive of the invention on the complex, the melting point of the complex is increased and slagging of the refractory is prevented.

The method of this invention involves introducing into the reactor an additive comprising materials selected from the group consisting of aluminum oxide and zirconium oxide. The material which is added is selected in relation to that material, such as aluminum and zirconium, which comprises the principal component of the refractory. These materials can be introduced into the reactor as oxides or in the form of compounds convertible to their oxide, such as the stearate, palmate, etc.

These materials are introduced into the reactor in a quantity related to the quantity of the extraneous material in the feedstock. Preferably, the additive will be introduced in a quantity in which the weight of the oxide of the additive is from about 5 to about 10 times the total weight of the equivalent of the oxide of barium, calcium and iron which is introduced with the feedstock.

For example, if the oxide of the extraneous material is barium oxide, the barium being introduced as barium sulfate, the aluminum compound is introduced in a quantity such that an equivalent of from 5 to 10 pounds of aluminum oxide are introduced per pound of barium, in terms of the oxide, present in the feedstock. The amount of additive so introduced is critical in that it is introduced in an amount sufficient to combine with the extraeous material in a "solid state reaction" but in an amount insufficient to significantly affect the structure of the carbon black produced. In other words, the quantity of the additive remaining uncombined with that material deleterious to the refractory, or remaining undeposited on the refractory if the second embodiment of the invention is employed, will be insufficient to affect the structure of the carbon black product.

The additive can be introduced into the reactor in any convenient manner. It can be introduced in any of the reactant streams or it can be introduced separately, for example, in a solvent such as benzene.

In the embodiment where its introduction is directed to forming a complex with the deleterious material contained in the feedstock, it is advantageously introduced with the feedstock.

Where the additive is introduced into the reactor to combine with the refractory, it can be introduced to flow, for example, in hot combustion gases in proximity of the reactor wall. The latter method can be carried out by introducing the additive through the periphery of the reactor and caused to flow along the refractory lining.

The following examples illustrate various embodiments of the invention.

EXAMPLE I

Carbon black was produced in a reactor at a hydrocarbon feed rate of about 2400 pounds per hour. An analysis of the feedstock indicated it to contain about 22 p.p.m. parts by weight of barium.

The hydrocarbon was being pyrolytically decomposed in a reactor lined with a refractory comprised principally of aluminum and minor amounts of silica and other oxides. The reaction was being conducted at about 2800° F. refractory temperature and refractory decomposition was taking place.

The introduction of aluminum oxide into the reactor was begun. It was introduced in the feed at the rate of about 0.4 pound per hour, this being equivalent to a rate of about six times the weight of barium in the feed as barium oxide.

As a result of this introduction, deterioration of the refractory was terminated but the properties of the carbon black product were substantially unchanged.

EXAMPLE II

The production of carbon black under the conditions of Example I was carried out in a precombustion reactor of the general configuration of that depicted in U.S. Pat. 2,564,700 to Krejci. Deterioration of the refractory was taking place.

The introduction of alumina additive was begun by introducing through the tangential fuel inlets a mixture of benzene and aluminum stearate, the amount of aluminum stearate introduced being sufficient to provide an aluminum oxide introduction rate of about 0.4 pound per hour, this being equivalent to a rate of about six times the weight of barium in the feed as barium oxide.

As a result of this introduction, deterioration of the refractory was terminated but the properties of the carbon black product were substantially unchanged.

It will be understood that various modifications can be made to the method of this invention. Such are considered, however, to be within the scope of this invention.

What is claimed is:

1. In a process for producing carbon black in which a hydrocarbon feed is pyrolytically decomposed in a carbon black reactor to carbon black in the presence of a material selected from the group consisting of barium, calcium, and iron, the improvement which comprises introducing into the reactor during said process an oxide of a material selected from the group consisting of aluminum and zirconium, said oxide being introduced in an amount sufficient to substantially prevent deterioration of the refractory lining of said reactor by said barium, calcium, or iron but in an amount insufficient to substantially affect the structure of the carbon black product.

2. The method of claim 1 in which said oxide is introduced into said reactor in an amount within the range of from about 5 to about 10 times the total weight of said barium, calcium and iron as oxides.

3. The method of claim 1 in which said oxide is introduced into said reactor to combine with said barium, calcium or iron in a solid state reaction.

4. The method of claim 1 in which said oxide is introduced so as to deposit on said refractory lining.

5. The method of claim 1 in which said oxide is introduced in said feed.

6. The method of claim 4 in which said oxide is introduced through the periphery of said reactor and is caused to flow along said refractory lining.

7. The method of claim 1 in which said oxide is alumina oxide.

8. The method of claim 1 in which said barium material is introduced with said hydrocarbon feed and said oxide is aluminum oxide.

9. The method of claim 8 in which aluminum oxide is introduced in an amount of about 6 times the total weight of said barium as barium oxide.

References Cited
UNITED STATES PATENTS

| | | | |
|---|---|---|---|
| 2,914,418 | 11/1959 | Eastman | 106—307 |
| 3,094,428 | 6/1963 | Hamilton et al. | 106—307 |
| 3,213,026 | 10/1965 | Jordan et al. | 23—209.4 X |
| 3,306,762 | 2/1967 | Ruble | 106—307 |
| 3,413,093 | 11/1968 | Friauf et al. | 23—209.4 |
| 3,512,934 | 5/1970 | Speck | 23—209.4 |
| 3,615,208 | 10/1971 | Byron | 23—209.4 |

EDWARD J. MEROS, Primary Examiner

U.S. Cl. X.R.

23—209.6; 106—307